(12) United States Patent
Chainer et al.

(10) Patent No.: US 6,430,001 B1
(45) Date of Patent: Aug. 6, 2002

(54) INTEGRATED DATA STORAGE DISK AND DISK DRIVE

(75) Inventors: Timothy Joseph Chainer, Mahopac; Dean A. Herman, Jr., Garrison; Sol Krongelb, Katonah; Lubomyr Taras Romankiw, Briarcliff Manor; Edward John Yarmchuk, Somers, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/405,278

(22) Filed: Mar. 16, 1995

(51) Int. Cl.⁷ .............................................. G11B 17/02
(52) U.S. Cl. .................................................. 360/99.08
(58) Field of Search .......................... 360/98.01, 98.07, 360/99.04, 99.08, 105–106; 310/40 MM, 90, 261, 267–268, 162–164, 308–309

(56) References Cited

U.S. PATENT DOCUMENTS

| | | | |
|---|---|---|---|
| 4,658,162 A | 4/1987 | Koyama et al. | 310/68 R |
| 4,933,785 A | 6/1990 | Morehouse et al. | 360/78.04 |
| 5,177,389 A | 1/1993 | Schalk | 310/171 |
| 5,191,251 A | 3/1993 | Paratte | 310/309 |
| 5,252,881 A | 10/1993 | Muller et al. | 310/309 |
| 5,257,151 A | * 10/1993 | Cooper et al. | 360/98.01 |
| 5,262,695 A | 11/1993 | Kuwano et al. | 310/309 |
| 5,296,775 A | 3/1994 | Cronin et al. | 310/309 |
| 5,304,878 A | 4/1994 | Oda et al. | 310/67 R |

FOREIGN PATENT DOCUMENTS

| | | |
|---|---|---|
| EP | 0 597 186 A2 | 5/1994 |
| EP | 0 637 022 A2 | 2/1995 |
| JP | 50-93408 | 7/1975 |
| JP | 51-24210 | 2/1976 |
| JP | 63-41150 | 2/1982 |
| JP | 57-158075 | 10/1982 |
| JP | 58-014371 | 1/1983 |
| JP | 59-052455 | 3/1984 |
| JP | 59-101068 | 6/1984 |
| JP | 62-121964 | 6/1987 |
| JP | 3-156770 | 7/1991 |
| JP | 3-198262 | 8/1991 |
| JP | 3-254464 | 11/1991 |
| JP | 4-263166 | 9/1992 |
| JP | 6-203522 | 7/1994 |
| WO | WO 94 29866 | 12/1994 |
| WO | WO 95 02247 | 1/1995 |

OTHER PUBLICATIONS

Hammer et al, "Design and control of an air–bearing supported three–degree–of–freedom fine positioner", IEEE, May 1992, pp. 677–684.*
Romankiw, "Think Small, One Day it May be Worth a Billion," Mar. 10, 1993, 2 pages.
Guckel et al, "A First Functional Current Excited Planar Rotational Magnetic Micromotor," Feb. 1993, IEEE, pp. 7–11.
Ahn et al, "A Planar Variable Reluctance Magnetic Micromotor with Fully Integrated Stator and Wrapped Coils," Feb. 1993, IEEE, pp. 1–6.
Chainer et al, "a Flexural In–Line Actuator for Magnetic Recording Disk Drives," IEEE Transactions on Magnetics, vol. 27, No. 6, Nov. 1991, pp. 5295–5297.
IBM, "PCMCIA Cards, The Future is in your Hands," 2 pages, product literature older than 1 year.
Ahn et al, "A Fully Integrated Micromachined Toroidal Inductor with a Nickel–Iron Magnetic Core(The Switched DC/DC Boost Converter Application)" Transducers 1994 Workshop, 4 pages.

* cited by examiner

Primary Examiner—George J. Letscher
(74) Attorney, Agent, or Firm—Francis L. Conte

(57) ABSTRACT

An integrated data storage disk and disk drive assembly includes a rotatably supported magnetic disk for storing data. A rotor is fixedly joined to the disk for rotating the disk, and includes a plurality of rotor poles. A stator includes a plurality of stator poles positioned around the rotor for sequentially cooperating with respective ones of the rotor poles for rotating the rotor to rotate the disk. The disk and drive may be fabricated using lithographic and electroplating techniques, and a plurality of coaxial disks may be driven by a single disk drive in exemplary embodiments.

21 Claims, 5 Drawing Sheets

INTEGRATED DATA STORAGE DISK AND DISK DRIVE

CROSS REFERENCE TO RELATED APPLICATION

The present invention is related to concurrently filed patent application Ser. No. 08/405,561, filed Mar. 16, 1995, entitled "Microfile."

BACKGROUND OF THE INVENTION

The present invention relates generally to data storage disks, and, more specifically, to disk drives therefor.

One type of media for the storing of binary bits of computer data is a magnetic disk typically referred to as a hard disk or hard drive. The disk includes a substrate having a suitable magnetic coating for allowing data to be written thereto and read therefrom in a conventional fashion using a suitable read/write access head. Advances in disk design are being continually made for storing ever increasing amounts of data in smaller and smaller disks. A typical standard disk has an outer diameter of about 3.5 inches (95 mm), with disks having even smaller diameters of 2.5 inches (65 mm), 1.8 inches (47 mm), and 1.3 inches (35 mm) also being known.

In order to access data storage sectors on the disk, both the access head and the disk are suitably set into motion, with the disk being typically rotated at a suitable rotational velocity. A typical disk drive motor is mounted to the center of the disk for suitably spinning the disk for allowing access to the various sectors thereof.

In a separate development, micro-electromechanical systems (MEMS) such as various types of variable reluctance magnetic micromotors are being fabricated using high aspect ratio lithographic techniques and electroplating processes to form the components thereof. A rotor having one set of poles is assembled to a stator having another set of poles for forming the micromotor. The stator poles include a core formed of a high permeability, low coercivity, high moment magnetic material such as a nickel-iron alloy around which is formed a conducting coil such as copper. Other suitable materials include NiFeCo, CoFeCu, and 55/45 Fe/Ni. The stator and a stationary support pin for the rotor may be formed using a dielectric such as polyimide in a multilevel fabrication process using suitable lithographic masks to define the required components and conventional electroplating for forming the magnetic core, the conducting coils, and the rotor support pin. The rotor and its poles are separately fabricated using lithographic and electroplating techniques in a conventional manner. The assembled micromotor requires no permanent magnets to produce a torque moment. The stator coils are arranged in one or more sets, and phases are excited individually or in pairs to produce torque for rotor rotation. When a phase coil is excited, the nearest rotor poles adjacent to the excited stator poles are attracted to the stator poles. The rotor then rotates to align the rotor poles with the excited stator poles, at which time the excited phase is cut off, and the next phase is then excited to maintain continuous rotation of the rotor by sequentially exciting the stator poles.

Conventional storage technology such as magnetic or optical disk drives include a storage medium which is rotated by an external motor which is attached to the storage medium through a mechanical hub. As the size form factors of disk drives continue to decrease, this conventional design will not be economically or physically desirable. In order to reduce the size, it is desirable to integrate therewith a micromotor for rotating the storage media and further to provide the integration of wiring connections to the drive circuitry.

SUMMARY OF THE INVENTION

An integrated data storage disk and disk drive assembly includes a rotatably supported magnetic disk for storing data. A rotor is fixedly joined to the disk for rotating the disk, and includes a plurality of rotor poles. A stator includes a plurality of stator poles positioned around the rotor for sequentially cooperating with respective ones of the rotor poles for rotating the rotor to rotate the disk. The disk and drive may be fabricated using lithographic and electroplating techniques, and a plurality of coaxial disks may be driven by a single disk drive in exemplary embodiments.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
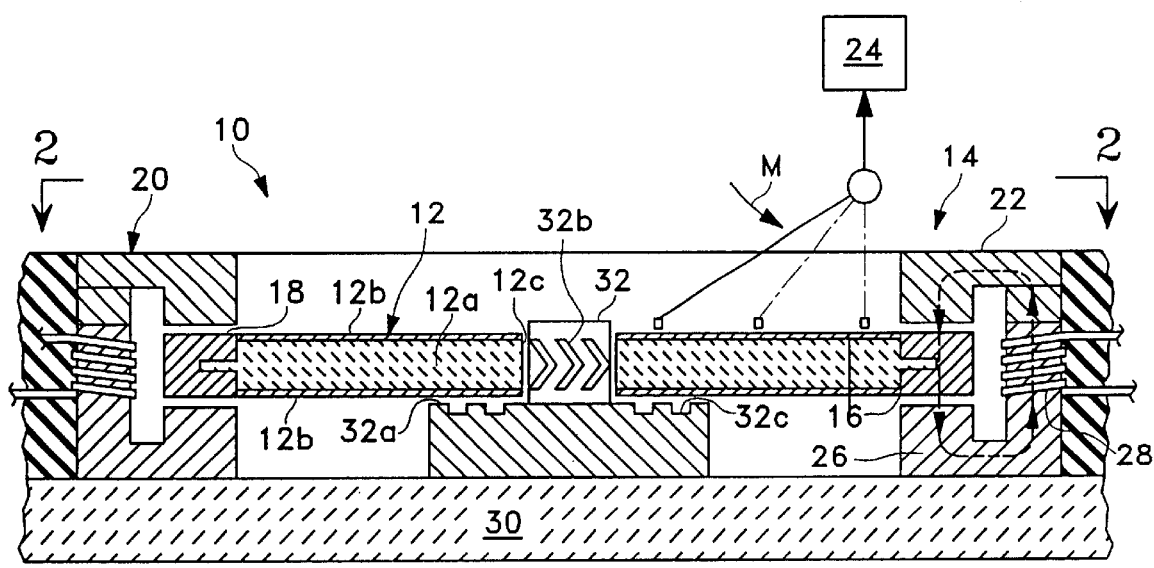
FIG. 1 is a schematic, elevational, sectional view through a portion of an integrated disk and disk drive in accordance with one embodiment of the present invention, and taken generally along line 1—1 in FIG. 2.
Figure 2:
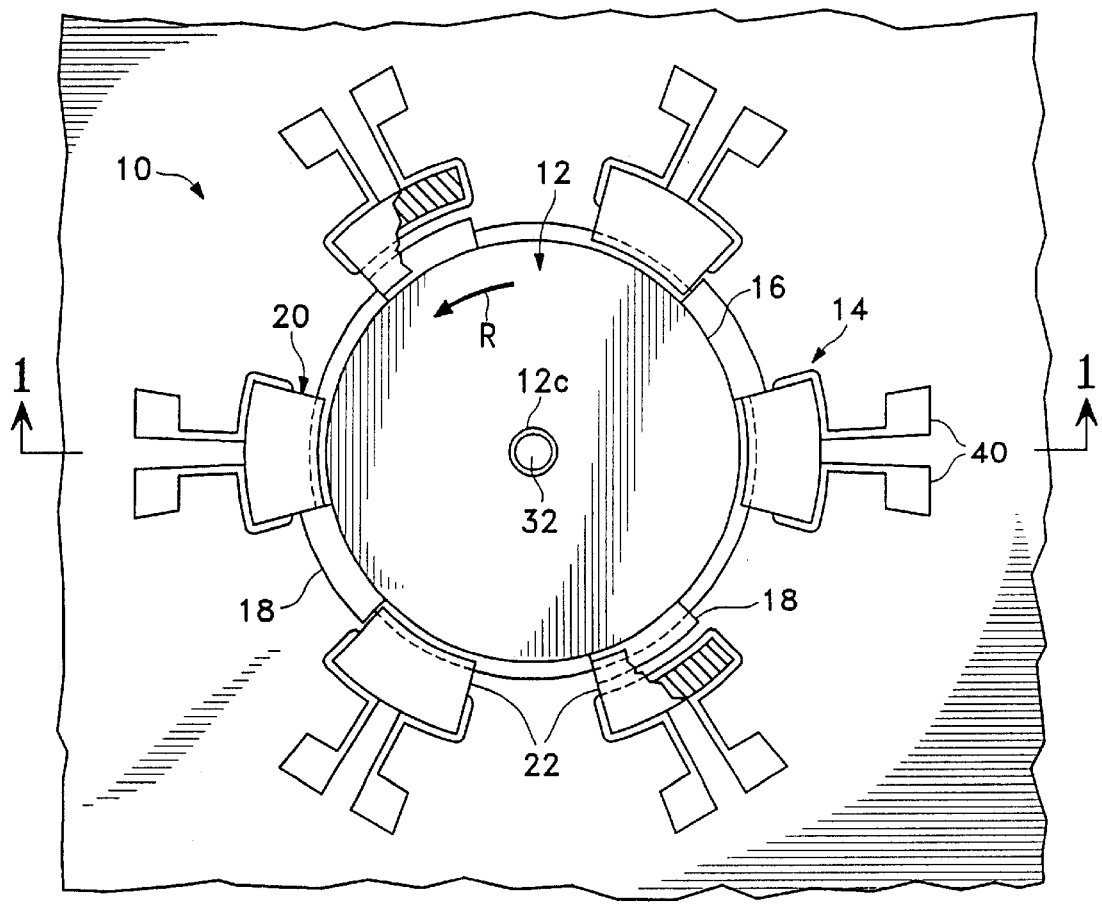
FIG. 2 is a top view of the integrated assembly illustrated in FIG. 1 and taken along line 2—2.

Illustrated schematically in FIGS. 1 and 2 is an exemplary embodiment of an integrated data storage disk and disk drive assembly 10, also referred to as a microfile, in accordance with one embodiment of the present invention. The microfile 10 includes a rotatably supported magnetic storage disk 12 for magnetically storing data or information in a conventional manner using binary data bits in this exemplary embodiment. In accordance with one feature of the present invention, a micromotor 14 is integrated with the disk 12 for providing an effective direct disk drive therefor. The micromotor 14 includes a rotor 16 integrated with the disk 12 in a one-piece assembly for rotating the disk 12 therewith, with the rotor 16 comprising a plurality of magnetic rotor poles 18 extending radially outwardly from the perimeter of the rotor 16 and being circumferentially spaced apart from each other therearound. In the exemplary embodiment illustrated in FIGS. 1 and 2, there are four rotor poles 18 equiangularly spaced apart from each other.

The micromotor 14 further includes a stator 20 having a plurality of magnetic stator poles 22 circumferentially spaced apart from each other around the rotor 16 for sequentially cooperating with respective ones of the rotor poles 18 for rotating the rotor 16 to in turn drive or rotate the disk 12 for magnetically writing data thereto and reading data therefrom using a suitable read and write or access head assembly 24. In the exemplary embodiment illustrated in FIGS. 1 and 2, there are six stator poles 22 equiangularly spaced apart from each other.

The resulting micromotor 14 is one type of variable reluctance magnetic motor which does not require permanent magnets to produce torque for rotating the disk 12. However, embodiments which include permanent magnets may be used in conjunction with the present invention. The micromotor 14 may have any suitable number of rotor and stator poles 18, 22 cooperating in a conventional manner for imparting rotation of the disk 12 by sequentially energizing the stator poles 22 in different phases for rotating the rotor poles 18 and in turn the disk 12 joined thereto. In the exemplary embodiment illustrated in FIG. 2, diametrically opposite pairs of the stator poles 22 may be suitably energized with current which will magnetically attract directly adjacent rotor poles 18 thereto and therefore cause rotation thereof. When one set of the diametrically opposite rotor poles 18 is aligned with the excited set of stator poles 22, power thereto is interrupted, with power then being applied in turn to an adjacent set of stator poles 22 for magnetically attracting thereto another set of the rotor poles 18. In this way, the stator poles 22 may be energized sequentially for sequentially attracting adjacent rotor poles 18 for maintaining continuous rotation of the rotor 16 and in turn the disk 12. The stator poles 22 are therefore arranged in cooperating pairs on opposite sides of the rotor 16, with sequential stator pole pairs being electrically energized in different phases for maintaining rotation of the rotor 16 and the disk 12.

The microfile 10 may be fabricated substantially smaller in size than that of conventional disks by using conventional high aspect ratio lithographic and metal deposition such as electroplating techniques in batch fabrication processes. For example, the combined disk 12 and rotor 16 illustrated in FIGS. 1 and 2 may have an outer diameter of about 35 mm, and smaller if desired, with a thickness of about 500 microns for example. In the exemplary embodiment illustrated in FIGS. 1 and 2, the magnetic disk 12 is integrated directly with the rotor 16 at its perimeter, with the rotor 16 therefore being coplanar with and integrally surrounding the disk 12. The integrated disk and rotor 12, 16 may be conventionally fabricated, for example, by using a suitable substrate 12a, such as a silicon wafer, in the form of a disk, with the top and bottom surfaces thereof being conventionally coated with a suitable high coercivity magnetic storage medium 12b, such as cobalt platinum chrome sputtered thereon in a thin layer. Other suitable media include CoTaCr, CoWCr, and CoNiP. The perimeter of the disk 12 defines the base of the rotor 16, with the rotor poles 18 being formed of a suitable high permeability, low coercivity, high moment, or soft magnetic material such as a nickel-iron alloy and the others mentioned above. The magnetic material forming the rotor poles 18 may be suitably electroplated at the perimeter of the disk 12, or otherwise formed thereat.

As indicated above, by sequentially energizing the stator poles 22 shown in FIG. 2, the cooperating rotor poles 18 are magnetically attracted thereto for rotating the disk 12 in the exemplary counterclockwise rotation direction R. The access head assembly 24 illustrated schematically in FIG. 1 may be selectively moved as represented by the arrow M for accessing the various sectors between the inner and outer diameters of the disk 12 for reading and writing data in a conventionally known manner.

Referring again to FIG. 1, each of the stator poles 22 includes a suitable magnetic core 26 integrally wound with an electrically conducting excitation coil 28 for generating a magnetic flux through the core 26 upon energizing thereof. In the exemplary embodiment illustrated in FIG. 1, the coils 28 spiral around the cores 26 in three dimensions with a suitable number of turns thereof. And, each of the stator cores 26 is generally C-shaped in elevation or transverse section and has top and bottom legs which vertically straddle both top and bottom of the rotor 16 for creating a magnetic flux path, shown in dashed line in FIG. 1, axially through the rotor poles 18 between opposite sides thereof. As shown in FIG. 1, the coil 28 is disposed solely on the base leg of the core 26, but in alternate embodiments may be disposed on all three legs if desired.

In the exemplary embodiment illustrated in FIG. 1, the stator 20 may be formed in layers using high aspect ratio lithographic and metal deposition techniques on a suitable substrate 30 such as a silicon wafer. Optical (photo) and X-ray lithography are conventional processes that may be used; and electroplating, electroless plating, and sputtering are also conventional processes that may be used. A suitable support shaft or pin 32 is built up from the substrate 30 by electroplating, and is received in a central bore 12c of the disk 12 for allowing the disk 12 and integral rotor 16 to rotate on the shaft 32. The shaft 32 includes a step 32a for axially supporting the disk 12 when it is stationary if desired, and includes a self-pressurizing air journal bearing 32b in the form of a plurality of circumferentially spaced apart chevron-shaped indentations therein. And a self-pressurizing air thrust bearing 32c in the form of grooves in the step 32a may also be used to support the disk 12 during rotation.

The resulting microfile 10 may be fabricated in relatively small sizes with the disk 12 being directly driven by the integral micromotor 14. Although data is stored on the disk 12 magnetically, it is not compromised by the magnetic field associated with the integrated micromotor 14 due to the placement of the micromotor 14 around the perimeter of the disk 12 and due to the relatively low magnetic flux leakage from the micromotor 14. The stator poles 22 may be suitably sized and operated for rotating the rotor 16 with a magnetic flux leakage of at least an order of magnitude less than the magnetic flux required for magnetically recording the data on the disk 12. Typical magnetic flux leakage from the micromotor 14 may be on the order of about 50 Gauss, whereas the magnetic flux required for writing to the disk 12 is typically on the order of about 1,000 Gauss. If desired, suitable shielding (not shown) may be provided around the micromotor 14 to additionally protect the integrity of the data magnetically stored on the disk 12.

The microfile 10 may be sized and operated for rotating the disk 12 within an exemplary range of 3,500 to 35,000 rpm. The journal and thrust bearings 32b,c support the disk 12, and the stator poles 22 provide rotation thereof with little or no rubbing between the components, with the disk 12 being effectively supported on an air cushion. In one embodiment, the disk 12 may have a thickness of less than about 0.2 mm, an outer diameter of about 10 mm, and a density of about 3 gm/cc, with the time to spin-up to about 10,000 rpm being about 2 milliseconds. The head assembly 24 may be a conventional Winchester type head suspension or any other type of recording head suspension assembly.

Figure 3:
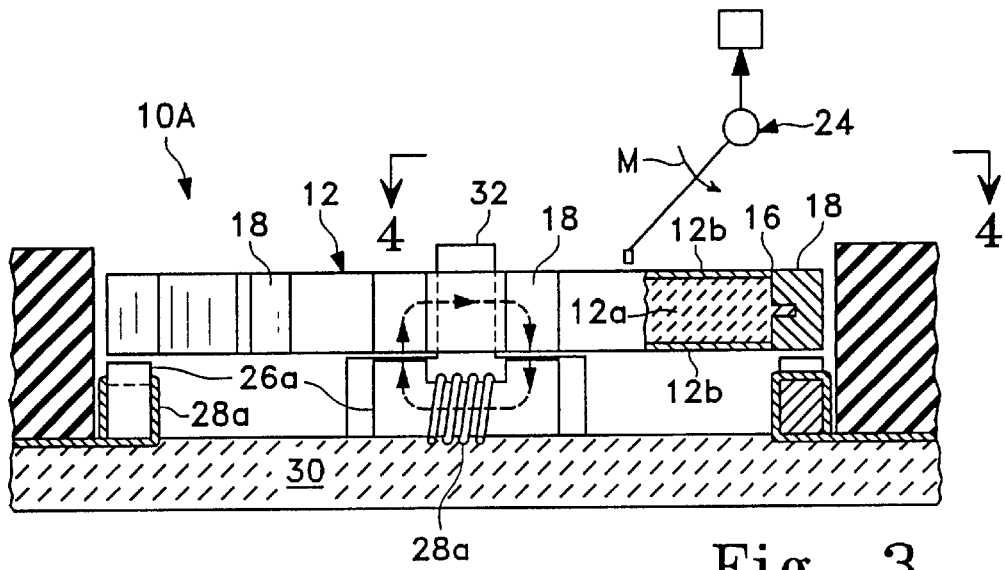
FIG. 3 is a schematic, elevational, partly sectional view of an integrated disk and disk drive assembly in accordance with another embodiment of the present invention.
Figure 4:
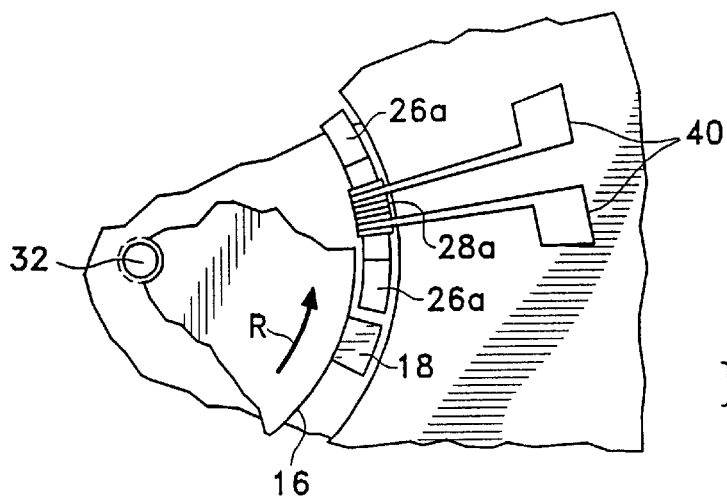
FIG. 4 is a top view of a portion of the integrated assembly illustrated in FIG. 3 and taken along line 4—4.

Illustrated in FIGS. 3 and 4 is another embodiment of an integrated microfile designated 10A which is generally similar to the microfile 10C illustrated in FIG. 6 below except that each of the generally U-shaped stator cores, designated 26a, is disposed vertically in elevation and is disposed solely on the bottom side of the rotor 16 for creating a magnetic flux path, shown in dashed line in FIG. 1, axially and circumferentially through the rotor poles 18 from only one side thereof. The coil, designated 28a, spirals around the base leg of the core 26a, with the adjacent core legs providing a suitable flux path into and out of the cooperating rotor poles 18.

Figure 5:
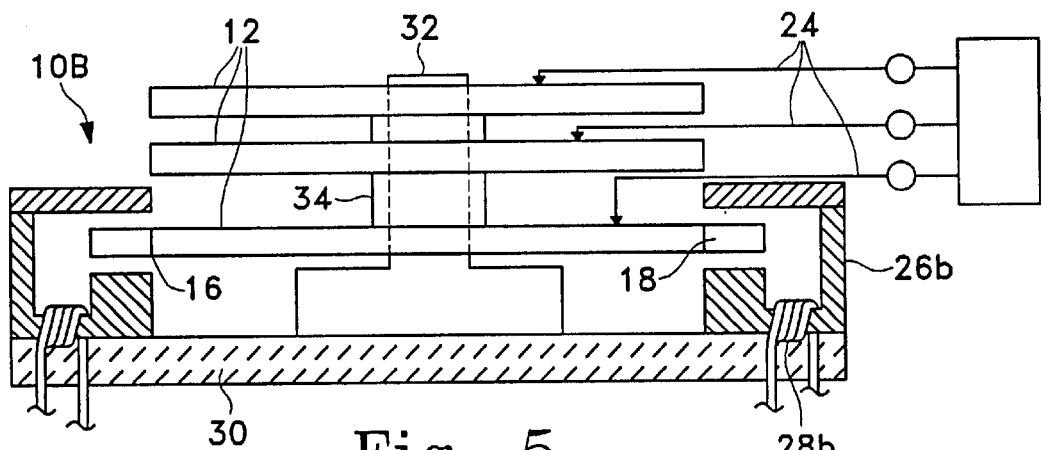
FIG. 5 is a schematic, elevational, partly sectional view of an integrated multidisk and disk drive assembly in accordance with another embodiment of the present invention.

Illustrated in FIG. 5 is another embodiment of an integrated microfile designated 10B wherein a plurality, for example three, of the magnetic disks 12 are coaxially joined to a hollow rotor shaft 34, with the disks 12 being axially spaced apart from each other for allowing independent read and write access thereto by corresponding ones of the access head assemblies 24. In this embodiment, the rotor 16, and its integral rotor poles 18, is integral with only the bottom one of the disks 12 in a manner identical to that illustrated in the FIG. 1 embodiment, for simultaneously rotating all the disks 12 attached to the rotor shaft 34. The rotor shaft 34 itself is suitably supported on the support shaft 32 extending therethrough. In this embodiment, the cores designated 26b are also generally C-shaped and similar to the cores 26 illustrated in the FIG. 1 embodiment, with the coils, designated 28b, being disposed on the bottom legs of the cores 26b.

Figure 6:
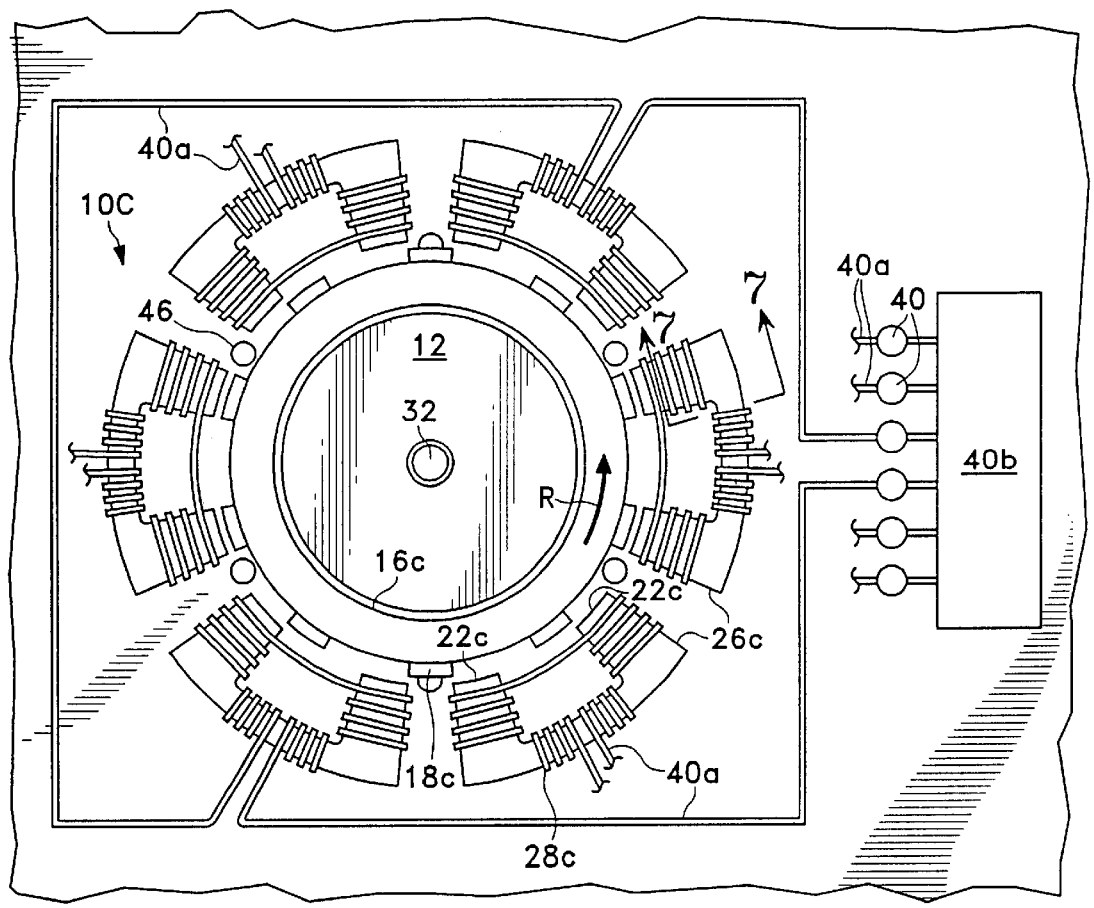
FIG. 6 is a top view of an integrated disk and disk drive in accordance with another embodiment of the present invention.
Figure 7:
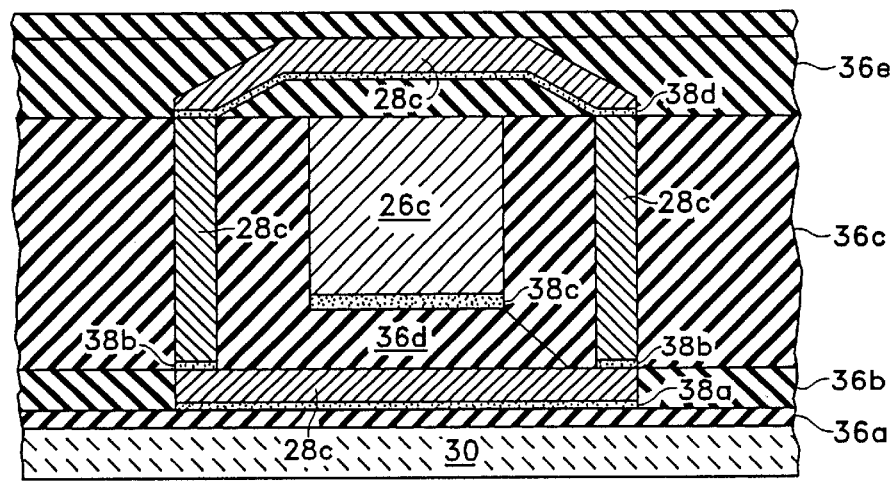
FIG. 7 is an elevational, sectional view through a portion of a stator core and surrounding coil illustrated in FIG. 6 and taken along line 7—7.

Illustrated in FIGS. 6 and 7 is yet another embodiment of a microfile designated 10C. In this embodiment, each of the stator cores, designated 26c, is generally U-shaped and is disposed coplanar with the rotor, designated 16c. Each U-shaped stator core 26c defines a pair of circumferentially adjacent stator poles 22c. The rotor 16c is in the form of a magnetic ring integrally joined to the rotor poles, designated 18c, extending radially outwardly therefrom for carrying magnetic flux between diametrically opposite ones of the rotor poles 18c. In the exemplary embodiment illustrated in FIG. 6, there are ten rotor poles 18c equiangularly spaced apart from each other around the rotor 16c at 36°. Each rotor pole 18c is about 12° in width. And, there are twelve stator poles 22c with adjacent poles 22c of each core 26c being spaced apart at 36°, and adjacent cores 26 being spaced apart at 24° between the adjacent stator poles 22c. Each stator pole 22c is about 12° wide. This stator/rotor pole arrangement is one of many conventional arrangements which may be used for rotating the rotor 16c by sequentially energizing the stator poles 22c in three phases, e.g. thirty strokes of 12° each per revolution.

Also illustrated schematically in FIG. 6 are a plurality of conventional position sensors 46 suitably located adjacent to the rotor 16 for detecting position of the rotor poles 18c to enable commutation of the rotor 16 as is conventionally known. However, the sensors 46 may be directly integrated on the substrate 30 in accordance with another feature of the present invention to provide integrated current paths to the drive electronics. These sensors 46 may also be used in all the other embodiments of the invention disclosed herein although not shown in the other figures.

A significant feature of the various embodiments of the microfiles disclosed herein is the ability to fabricate the microfiles using conventional lithographic and metal deposition techniques with multiple microfiles being produced in a batch fabrication process. Many microfiles may be fabricated on a single substrate which may then be cut to separate each of the microfiles so produced. Fabrication of the integrated disk 12 and rotor 16 is a relatively simple process as described above. However, since it is desirable to fully integrate the stator pole cores 26 and coils 28 in three dimensions therearound, fabrication thereof is relatively more complex but may nevertheless be accomplished using conventionally known lithographic and electroplating techniques.

These techniques are generally carried out as a sequence of steps in which (1) a thin seed layer is applied over the entire surface topography, (2) a polymer is applied over the seed layer and openings are photolithographically defined in the polymer to serve as molds for electroplating, (3) the magnetic or electrically conductive material, as required, is electroplated into the defined openings, (4) the patterned polymer layer is removed and (5) those portions of the seed layer which were masked by the polymer are removed, typically by wet chemical etching or by sputter etching. The fabrication of a complex structure is typically accomplished by carrying out the above sequence several times with different masks and material by introducing layers as needed. It is understood that this process could be extended to provide multiple layers of coils which surround the stator cores.

For example, FIG. 7 illustrates a representative section of a fully integrated core 26c and coil 28c therearound. The fabrication process starts with a suitable silicon wafer substrate 30 on which is suitably deposited a dielectric layer 36a such as hard baked photopolymers, polyimides, or $SiO_2$. Various lithographic optical and x-ray masks may be used as required for defining the various features of the stator 20. Additional dielectric layers 36b,c such as polyimide are formed and then suitably etched to form electroplating molds for the magnetic and electrically conducting components. A suitable seed layer 38a is conventionally sputtered on the bottom dielectric layer 36a so that the bottom of the coil 28c may be formed by conventional electroplating of copper. Additional dielectric 36d such as polyimide is layered atop the electroplated bottom coil 28c, and a second seed layer 38b is applied so that the vertical portions of the coil 28c may be formed by a second lithography and electroplating sequence. The core 26c is suitably electroplated atop another seed layer 38c and is formed between the bottom and side portions of the coil 28c with a dielectric 36d providing electrical insulation therebetween. The top portion of the coil 28c is also suitably electroplated atop a seed layer 38d for bridging the vertical portions of the coil 28c between adjacent turns thereof. Additional dielectric 36e may be layered over the top of the coil 28c to complete the vertical section thereof.

The support shaft 32, such as illustrated in FIG. 1 for example, may be similarly formed by electroplating a suitable metal, such as copper for example, atop the substrate

30. As shown in FIG. 6, for example, suitable bonding pads 40, or electrical terminals, are also formed integral in the substrate 30 and joined to respective ends of the individual coils 28c by electrical conductive lines 40a also formed on the substrate 30 for providing electrical current paths. The pads 40 may be disposed at a convenient location on the substrate 30, with the lines 40a having suitable elongate paths to diametrically opposite pairs of the stator coils 28c to form a series circuit powered by a suitable drive electronics set 40b which may be an integrated circuit module bonded to the substrate or lithographically formed thereon. Power is provided to the coil 28 from the drive electronics 40b through the pads 40 to sequentially energize the respective stator poles 22c for rotating the disk 12.

As shown in FIG. 7, the completed core 26c and coil 28 are fully integrated with each other in a one-piece component and include electroplated magnetic material defining the core 26c, and electroplated conducting material defining the coil 28c, and a baked dielectric 36d therebetween which provides structural strength and electrical insulation. The lithographic and electroplating techniques for forming the section illustrated in FIG. 7 may be suitably applied for forming the various embodiments of the invention illustrated in the several Figures.

Figure 8:
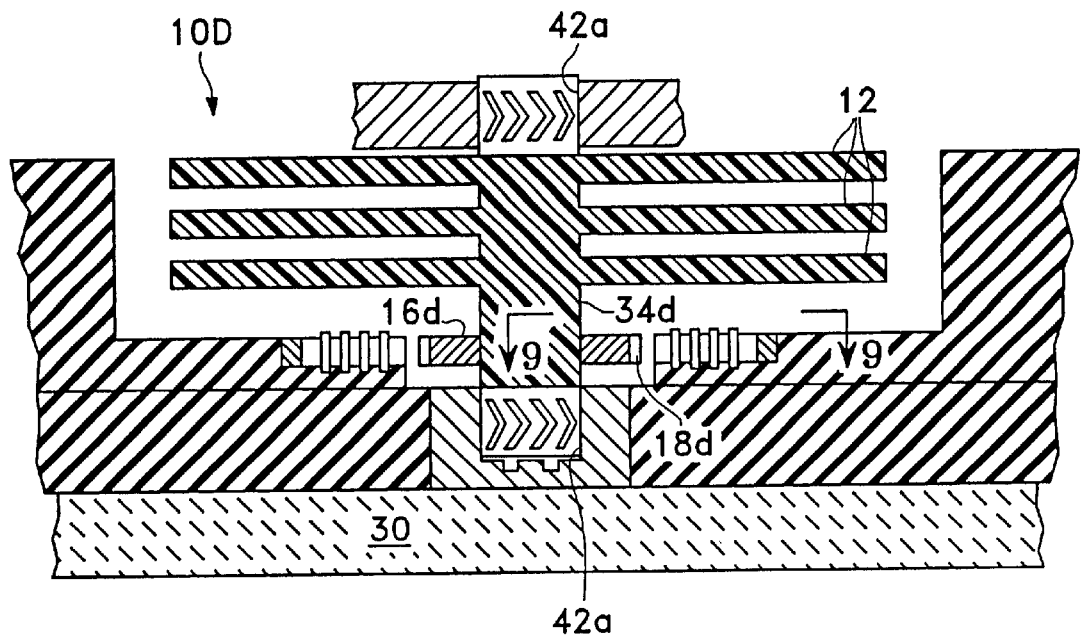
FIG. 8 is a schematic, elevational, sectional view of an integrated multidisk and disk drive in accordance with another embodiment of the present invention.
Figure 9:
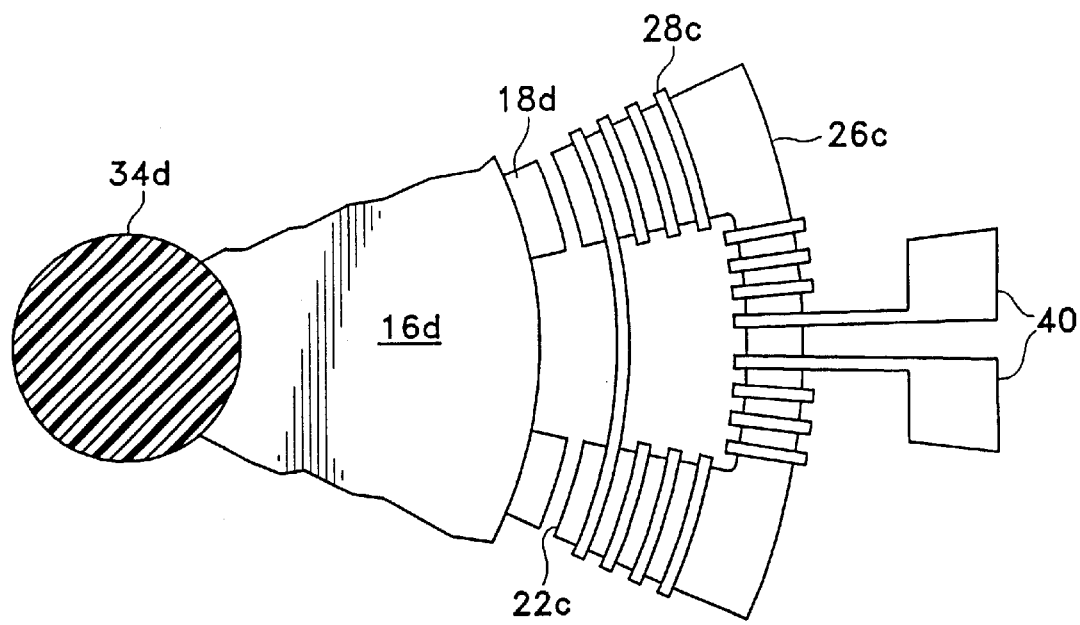
FIG. 9 is a top, partly sectional view of a portion of the integrated assembly illustrated in FIG. 8 and taken along line 9—9.

Illustrated in FIGS. 8 and 9 is yet another embodiment of a microfile designated 10D having a plurality of magnetic disks 12 coaxially joined to a solid rotor shaft 34d, and wherein the rotor, designated 16d, is coaxially joined to the rotor shaft 34d and axially spaced from the disks 12 for simultaneously rotating all the disks 12. In this embodiment, the rotor 16d is not directly formed or integrated with one of the disks 12 around the circumference thereof, but is a separate component fixedly joined to the common rotor shaft 34d. The entire rotor 16d may be formed of a suitable magnetic material for cooperating with the coplanar stator cores which are identical to the stator cores 26c illustrated in the FIG. 6 embodiment.

Also in this embodiment, the rotor shaft 34d and the integral disks 12 may be formed of a suitable material such as ABS plastic which can be injection molded, with suitable magnetic coatings being applied to the surfaces of the disks 12 for providing the magnetic storage media thereon, and with the rotor 16d being suitably assembled to or formed on the shaft 34d. In the exemplary embodiment illustrated in FIG. 8, the rotor shaft 34d is solid and is supported in self pressurizing air bearings 42a at the top and bottom thereof for allowing rotation with little or no friction.

Figure 10:
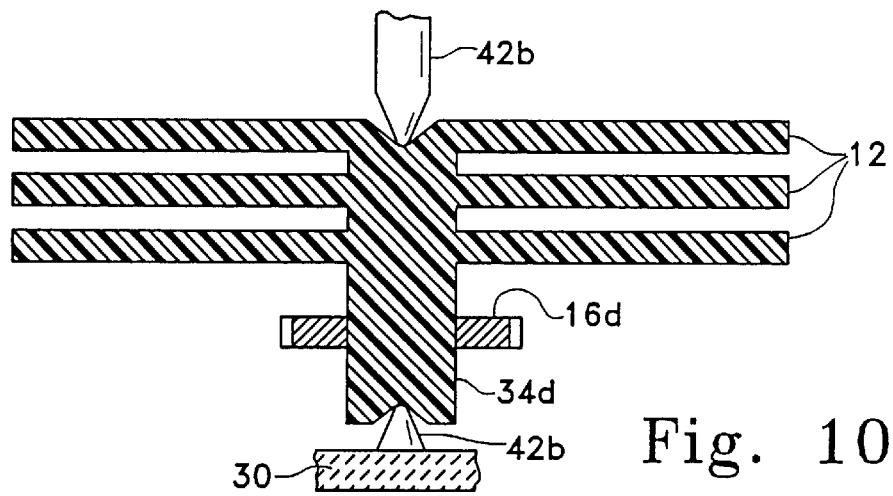
FIG. 10 is an elevational, partly sectional view of a portion of a multidisk and disk drive mounted in needle bearings in accordance with another embodiment of the present invention.
Figure 11:
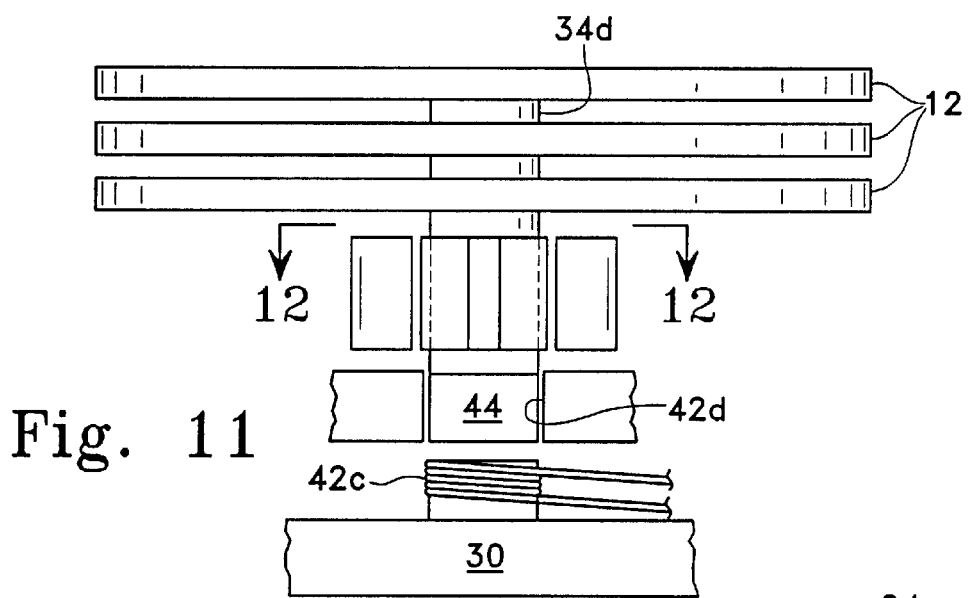
FIG. 11 is an elevational view of an integrated multidisk and disk drive having a magnetic levitation bearing in accordance with another embodiment of the present invention.

FIG. 10 illustrates a similar embodiment wherein the rotor shaft 34d may be suitably supported at its top and bottom by needle bearings 42b, for example those made with sapphire, diamond, or silicon carbide rotating in a conical dimple sputtered with a suitably hard and wear resistant material. And, FIG. 11 illustrates another similar embodiment wherein the bottom of the shaft 34d is supported by a suitable magnetic levitation bearing 42c which includes a coil wound magnetic core which can be energized for providing an opposing force to a permanent magnet 44 joined to the bottom end of the shaft 34d for levitating the shaft 34d during operation. A suitable radial magnetic bearing 42d also surrounds the shaft 34d for restraining radial movement thereof.

Figure 12:
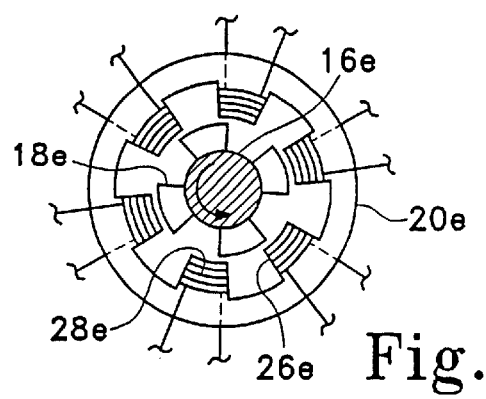
FIG. 12 is a top sectional view of the disk drive illustrated in FIG. 11 and taken along line 12—12.

Illustrated also in FIG. 11, and in FIG. 12, is another type of variable reluctance magnetic micromotor having a stator 20e in the form of an annular yoke from which extend radially inwardly therefrom a plurality of stator pole cores 26e each wound with a coil 28e for cooperating with the rotor poles 18e in a conventional fashion for rotating the shaft 34d and in turn the multiple disks 12 thereon.

Figure 13:
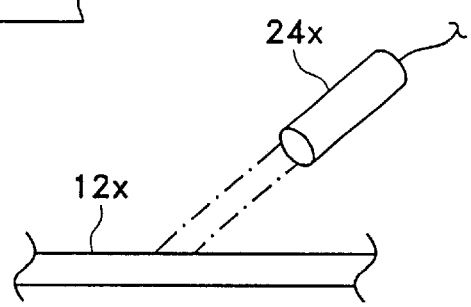
FIG. 13 is a schematic sectional view of an integrated disk and disk drive in accordance with another embodiment of the present invention.

Although the above described embodiments utilize a magnetic data storage disk 12, the disk may take other conventional forms for storing data. FIG. 13 illustrates schematically a portion of a data storage disk 12x on which data may be suitably stored, and optically read using a conventional optical laser reading head 24x. The optical disk 12x may take conventional forms such as CD ROM, Write-Once-Read-Many times (WORM), magneto-optic or phase-change disks.

The various microfiles disclosed above indicate the various possibilities of integrating a micromotor with a data storage disk 12 which allows the size thereof to be further reduced to substantially small dimensions. By driving the disk 12 from its outer perimeter, maximum torque may be applied to the disk 12 for quickly accelerating it to suitable speeds for use in reading and writing data. The number of poles can be increased to provide increased torque.

In accordance with the present invention, a solution to the limitations of implementing micromechanical technology to a data storage subsystem with a rotating storage medium is presented. The invention integrates micromotor technology on the outside rim of the disk medium in one embodiment, where the torque will be a maximum. And where the number of poles can be increased through lithographic microfabrication to increase torque. The integrated stator coils will enjoy low thermal resistance to the substrate for providing optimum heat dissipation, with the integration of the wiring lines to the coils allowing reduction in assembly costs.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. An integrated data storage disk and disk drive assembly comprising:

a rotatably supported storage disk for storing data;

a rotor integrated with said disk in a one-piece assembly for rotating said disk, and having a plurality of magnetic rotor poles extending radially outwardly from a perimeter of said rotor and being circumferentially spaced apart from each other therearound;

a stator having a plurality of magnetic stator poles circumferentially spaced apart from each other around said rotor for sequentially cooperating with respective ones of said rotor poles for rotating said rotor to rotate said disk for allowing said data to be written thereto and read therefrom;

each of said stator poles comprising a magnetic core integrally wound with an electrically conducting coil for generating a magnetic flux through said core upon energizing thereof; and said stator cores and coils being integrated on a substrate and comprising deposited magnetic material and deposited conducting material, respectively, and a dielectric therebetween.

2. An assembly according to claim 1 wherein said stator poles are arranged in cooperating pairs on opposite sides of said rotor, with sequential stator pole pairs being electrically energizable in different phases for maintaining rotation of said rotor and disk.

3. An assembly according to claim 2 wherein said stator pole coils spiral around said stator pole cores.

4. An assembly according to claim 3 wherein said rotor is coplanar with and integrally surrounds said disk.

5. An assembly according to claim 4 wherein each of said stator cores is generally C-shaped in elevation and straddles both top and bottom of said rotor for creating a flux path axially through said rotor poles between opposite sides thereof.

6. An assembly according to claim 4 wherein each of said stator cores is generally U-shaped in elevation and is disposed solely on one side of said rotor for creating a flux path axially and circumferentially through said rotor poles from one side thereof.

7. An assembly according to claim 4 wherein each of said stator cores is generally U-shaped and is disposed coplanar with said rotor, and defines a pair of circumferentially adjacent stator poles.

8. An assembly according to claim 7 wherein said rotor comprises a magnetic ring integrally joined to said rotor poles for carrying magnetic flux between diametrically opposite ones of said rotor poles.

9. An assembly according to claim 4 wherein said disk includes a central bore receiving therein a support shaft for allowing said disk to rotate on said support shaft.

10. An assembly according to claim 4 further comprising a plurality of said storage disks coaxially joined to a rotor shaft and axially spaced apart from each other for allowing independent access thereto, and said rotor is integral with only one of said disks for simultaneously rotating all said disks.

11. An assembly according to claim 3 wherein:
said storage disk is a magnetic disk for magnetically storing said data; and
said stator poles are sized for rotating said rotor with a magnetic flux leakage less than that required for magnetically recording said data on said disk.

12. An assembly according to claim 3 further comprising a plurality of said storage disks coaxially joined to a rotor shaft and axially spaced apart from each other for allowing independent access thereto, and said rotor is coaxially joined to said rotor shaft and axially spaced from said disks for simultaneously rotating all said disks.

13. An assembly according to claim 12 wherein said rotor shaft is solid and is supported in a bearing for allowing rotation thereof.

14. An assembly according to claim 13 wherein said bearing is an air bearing.

15. An assembly according to claim 13 wherein said bearing is a needle bearing.

16. An assembly according to claim 13 wherein said bearing is a magnetic levitation bearing.

17. An assembly according to claim 3 wherein said storage disk is an optically readable disk selected from the group including CD ROM, Write-Once-Read-Many times (WORM), magneto-optic, and phase-change disks.

18. An assembly according to claim 3 wherein said substrate further includes integrated conductive lines for electrically joining said coils to drive electronics.

19. An assembly according to claim 3 wherein said substrate further includes a plurality of integrated position sensors for detecting position of said rotor poles.

20. An assembly according to claim 1 wherein said integrated disk and rotor comprise a substrate having a magnetic storage medium disposed thereon radially inwardly of said perimeter, and said rotor poles are formed of a magnetic material fixedly joined to said substrate at said perimeter.

21. An assembly according to claim 20 wherein said rotor poles are non-permanent magnets, and said rotor and stator define a variable reluctance magnetic motor.

* * * * *